(12) United States Patent
Olson

(10) Patent No.: US 12,016,345 B2
(45) Date of Patent: Jun. 25, 2024

(54) SUPPORT STRUCTURE FOR WHEY DRAINING BELT

(71) Applicant: Tetra Laval Holdings & Finance S.A., Pully (CH)

(72) Inventor: Michael Olson, Buffalo, MN (US)

(73) Assignee: Tetra Laval Holdings & Finance S.A., Pully (CH)

( * ) Notice: Subject to any disclaimer, the term of this patent is extended or adjusted under 35 U.S.C. 154(b) by 856 days.

(21) Appl. No.: 17/128,481

(22) Filed: Dec. 21, 2020

(65) Prior Publication Data

US 2022/0192217 A1  Jun. 23, 2022

(51) Int. Cl.
*A23C 19/068* (2006.01)
*A01J 25/11* (2006.01)
*A23C 19/072* (2006.01)

(52) U.S. Cl.
CPC ......... *A23C 19/0686* (2013.01); *A01J 25/114* (2013.01); *A23C 19/072* (2013.01)

(58) Field of Classification Search
CPC ..... A01J 25/114; A01J 25/11; A23C 19/0686; A23C 19/072
See application file for complete search history.

(56) References Cited

U.S. PATENT DOCUMENTS

| | | | |
|---|---|---|---|
| 3,167,862 A | 2/1965 | Czulak | |
| 3,485,377 A | 12/1969 | McKenzie et al. | |
| 5,032,417 A * | 7/1991 | Jay | A01J 25/114 426/582 |

* cited by examiner

*Primary Examiner* — Dana Ross
*Assistant Examiner* — Joe E Mills, Jr.
(74) *Attorney, Agent, or Firm* — Renner, Otto, Boisselle & Sklar, LLP

(57) ABSTRACT

A support structure for a whey draining belt includes a beam formed of a metal material, and a slide plate formed of a plastic material and fixedly connectable to an upper part of the beam for allowing the whey draining belt to slide over the slide plate.

15 Claims, 4 Drawing Sheets

SUPPORT STRUCTURE FOR WHEY DRAINING BELT

TECHNICAL FIELD

The invention relates to a support structure for a whey draining belt, a whey draining machine and a method for draining whey from a curd and whey mixture.

TECHNICAL BACKGROUND

Different types of cheese may be produced using different types of production processes. A continuous and automated machine may be used to produce granular or matted curd cheese. When making cheddar or pasta filata cheeses, whey is generally removed from a mixture of cheese curd and whey using a whey screen and a draining belt. The curd and whey are first separated by the screen to remove the majority of the whey. The curd is then presented uniformly across the width of the moving belt such that the whey continues to drain. A chip mill may be provided at the end of the belt to mill the matted curd into curd chips. The curd chips may then be transferred to another downstream machine for further processing such as salting and mellowing.

Conventional whey draining machines are deficient in that friction between the belt and the belt support structure may cause interrupted motion of the belt, which is known as a stick-slip phenomenon. The engagement between the belt and the support structure may also subject the belt to wear such that the belt may have a limited life. Cleaning the underside of the belt may also present challenges. Still another disadvantage of the conventional whey draining machine is that tension in the belt may result in lower capacity for the whey draining machine.

SUMMARY

It is an object of the invention to at least partly overcome one or more limitations of the prior art. In particular, it is an object to provide a device and method that uses a plastic slide plate arranged on a metal support structure that enables the whey draining belt to slide over the slide plate.

According to an aspect of the invention, a support structure for a whey draining belt includes a beam formed of a metal material and a slide plate that is formed of a plastic material and fixedly connectable to an upper part of the beam for allowing the whey draining belt to slide over the slide plate.

Accordingly, the stick-slip phenomenon for the whey draining belt is reduced by reducing the friction between the plastic belt and the metal support beam. Instead, the friction is replaced by sliding friction between the plastic belt and the plastic slide plate. Thus, the static coefficient of friction and the dynamic coefficient of friction in a whey draining machine are reduced. In addition to reducing the stick-slip phenomenon, providing the slide plates reduces wear on the belt to increase the life of the belt and reduces belt tension to increase the capacity of the machine.

The slide plates may include notches that enable insertion of the slide plates down onto pins of the beam and forward movement for locking the slide plates in position during operation of the belt. The engagement between the slide plate and the pins may be provided by a single point or line contact that facilitates cleaning-in-place by spray devices positioned in the whey draining machine. The plastic slide plate may also be continuously supported by the metal support beam and may rest on top of the beam with a single contact point to further facilitate cleaning-in-place.

According to another aspect of the invention, a method of draining whey from a curd and whey mixture includes receiving a curd and whey mixture on a whey draining belt supported by a support structure having a beam formed of a metal material, and a slide plate formed of a plastic material and fixedly connectable to an upper part of the beam for allowing the whey draining belt to slide over the slide plate, and draining the whey from the curd and whey mixture as the whey draining belt slides over the slide plate to form curd.

This method may include the same features as the support structure for the whey draining belt and shares the same advantages.

Still other objectives, features, aspects and advantages of the invention will appear from the following detailed description as well as from the drawings.

BRIEF DESCRIPTION OF THE DRAWINGS

Features of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
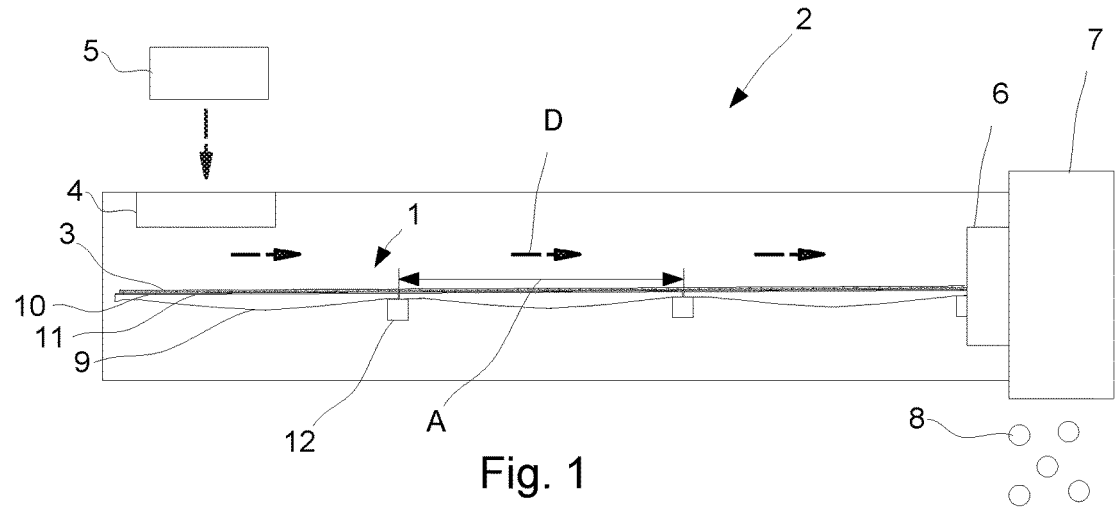
FIG. 1 is a schematic drawing of a whey draining machine for cheese production that includes a whey draining belt supported by a support structure.

With reference to FIG. 1, an exemplary support structure 1 in a whey draining machine 2 is shown. The support structure 1 supports a whey draining belt 3. The whey draining machine 2 may be configured for draining, matting, and milling, or include a salting and mellowing conveyor. The whey draining machine 2 may be any machine including a belt system for continuous cheese making. Cheeses such as cheddar or pasta filata cheeses may be produced using the whey draining machine 2. When making cheddar or pasta filata cheeses, the whey draining machine 2 is configured to remove whey from a mixture of cheese curd and whey using a whey screen and the whey draining belt 3.

The whey draining machine 2 includes an inlet 4 for receiving a curd and whey mixture 5 and an outlet 6 for discharging the curd 5 after the curd 5 is drained of whey.

The whey draining belt 3 is arranged to move the curd 5 downstream from the inlet 4 towards the outlet 6 in a direction of travel D. When the curd 5 reaches the outlet 6, the curd 5 may be processed by a milling machine 7 for milling the curd 5 into chips 8. The curd chips 8 may be drained stirred curds, curd vat, or milled curd. The curd chips 8 may be transferred downstream to another machine for further processing such as salting and mellowing.

The support structure 1 includes a beam 9 that supports the whey draining belt 3 and a slide plate 10 fixedly connectable to an upper part 11 of the beam 9 for allowing the whey draining belt 3 to slide over the slide plate 10. The whey draining belt 3 may have a length of approximately 27.4 meters (90 feet) or any other suitable dimensions. The beam 9 is formed of a metal material. Any suitable metal material may be used, such as stainless steel. The slide plate 10 is formed of a plastic material. Thermoplastic materials such as high molecular weight polyethylene (UHMW) may be suitable for forming the slide plate 10. The whey draining belt 3 may also be formed of a plastic material. Thermoplastic materials such as polypropylene may be suitable for forming the whey draining belt 3. The materials selected for the slide plate 10 and the whey draining belt 3 are configured to minimize the static coefficient of friction and dynamic coefficient of friction during operation of the whey draining belt 3. The whey draining belt 3 may be of any type that is commercially available for whey draining applications.

Each of the beam 9, the whey draining belt 3, and the slide plate 10 is elongated in the direction of travel D. The length of the slide plate 10 is longer as compared with the width of the slide plate 10. The length of the slide plate 10 may extend over an entire length A or nearly the entire length A of the beam 9. The whey draining machine 2 may include a plurality of support structures 1 that each include a separate beam 9 and slide plate 10. The support structures 1 may be arranged in an end-to-end manner from the inlet 4 to the outlet 6 in the direction of travel D such that the curd 5 is transferred from one support structure 1 to an adjacent support structure 1. Support structures 1 may also be arranged parallel to each other in the width direction from the inlet 4 to the outlet 6. Any number of support structures 1 may be provided. Support structures 1 are in turn held in place at their respective ends by carrier structures 12. Any suitable drive mechanism such a drive motor may be provided for each support structure 1 to move the whey draining belt 3. Whey is drained from the curd 5 as the curd 5 is transported along the whey draining belt 3. Even though only one whey draining belt 3 is illustrated, the whey draining machine 2 typically comprises a number of whey draining belts that are arranged in levels and which pass the curd 5 to each other to transport it from the inlet 4 to the outlet 6. Each of these whey draining belts may be supported by support structures as described herein.

Figure 2:
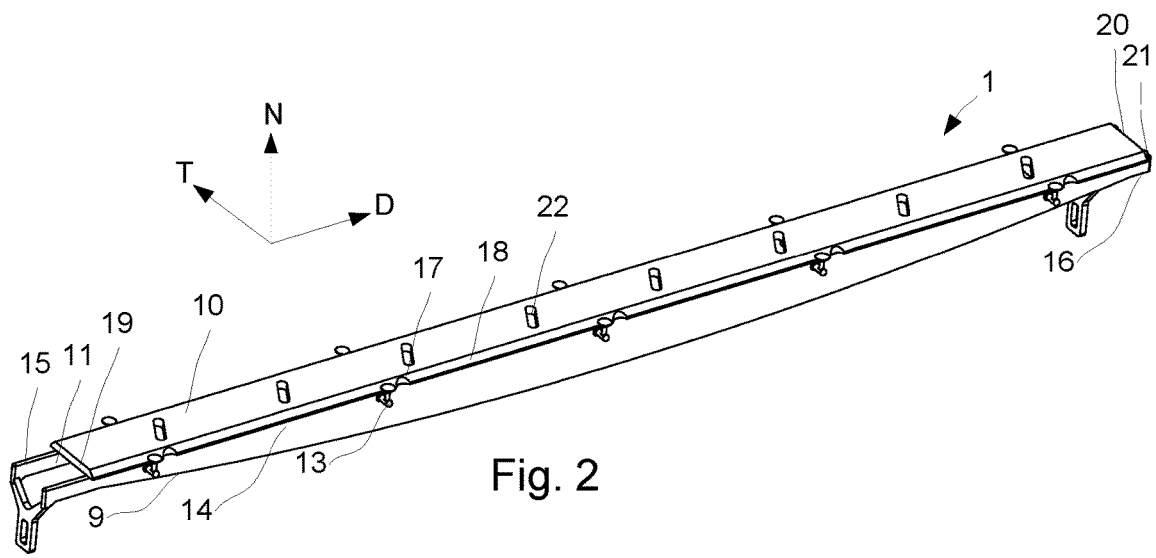
FIG. 2 is a perspective view of the support structure of FIG. 1 showing a beam and a slide plate of the support structure.
Figure 3:
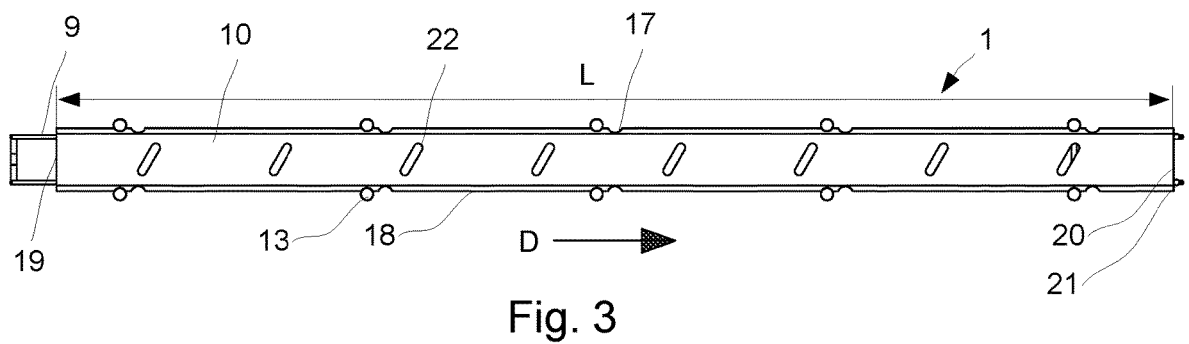
FIG. 3 is a top view of the support structure of FIG. 1.
Figure 4:
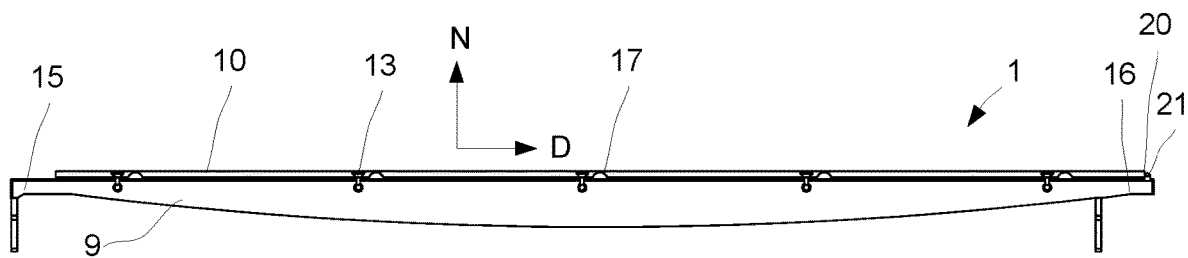
FIG. 4 is side view of the support structure of FIG. 1.

FIGS. 2-4 show the beam 9 of the support structure 1 including at least one pin 13 that is secured to the beam 9 and extends upwardly from the beam 9 to engage against the slide plate 10. A plurality of pins 13 may be arranged along opposing sides 14 of the upper part 11 of the beam 9 from a first end 15 of the beam 9 to a second end 16 of the beam 9. The pins 13 are configured to position the slide plate 10 during operation of the whey draining belt. The pins 13 may be spaced along the beam 9 and the pins 13 may be evenly spaced. The pins 13 arranged on the opposing sides 14 of the beam 9 may be aligned across the width of the beam 9 which extends in a transverse direction T relative to the direction of travel D. The transverse direction T may be arranged perpendicular relative to the direction of travel D. Accordingly, the pins 13 are directly across from each other as opposed to being staggered.

The slide plate 10 may be rectangular and planar in shape. The width of the slide plate 10 extends between pins 13 on the opposing sides 14 of the beam 9. A thickness of the slide plate 10 is less than the width and the length of the slide plate 10. The slide plate 10 may have a length that is approximately 1.8 meters (6.0 feet), a width that is approximately 10.5 centimeters (4.1 inches), and a thickness that is approximately 1.3 centimeters (0.5 inches). Other dimensions for the slide plate 10 may be suitable. The slide plate 10 includes at least one opening 17 for receiving a corresponding one of the pins 13 of the beam 9. The slide plate 10 may include a plurality of openings 17 that are spaced along opposing sides 18 of the slide plate 10. The opposing sides 18 extend in the longitudinal direction L of the slide plate 10 from a first end 19 to a second end 20 of the slide plate 10. The width of the slide plate 10 is greater than the width of the beam 9 such that the opposing sides 18 extend over the beam 9. The openings 17 are formed as a notch in the slide plate 10 and may be semi-circular in shape. The openings 17 may have any other suitable shape that is complementary to a shape of the pins 13 for receiving the pins 13.

The plurality of openings 17 formed in the slide plate 10 correspond to the plurality of pins 13 of the beam 9. The openings 17 may be spaced in the longitudinal direction L of the slide plate 10 and the openings 17 may be evenly spaced. The longitudinal direction L of the slide plate 10 also corresponds to the direction of travel D of the whey draining belt 3. Any number of pins 13 and openings 17 may be provided for each support structure 1. Between three and seven pins 13 and openings 17 per side may be provided. Five pins 13 and openings 17 per side may be provided. The number of pins 13 and the number of openings 17 is the same.

During assembly of the support structure 1, the slide plate 10 is lowered onto the beam 9 in a direction opposite the direction indicated by direction N in FIG. 2. The pins 13 are received in the openings 17 for lowering the slide plate 10 onto the beam 9 to an insertion position of the slide plate 10. The slide plate 10 is slidable in the longitudinal direction L of the slide plate 10 from the insertion position to an assembled position in which the pins 13 are offset from the openings 17 to engage the opposing sides 18 of the slide plate 10. The assembled position is shown in FIGS. 2-4.

The slide plate 10 is slid in the direction of travel D, which is parallel to the longitudinal direction L when the slide plate 10 is arranged on the beam 9. When the slide plate 10 is slid in the direction of travel D, the pins 13 are moved out of the openings 17 to engage the sides 18. The slide plate 10 may be slid in the direction of travel D until the second end 20 of the slide plate 10 engages a stopper 21 arranged at a downstream end of the beam 9. The stopper 21 is configured to position the slide plate 10 in the longitudinal direction D whereas the pins 13 and the openings 17 are configured to position the slide plate 10 in the transverse direction T and in the normal direction N of the slide plate 10. One or more stoppers 21 may be secured to the beam 9.

After the slide plate 10 is slid into the assembled position, the slide plate 10 is locked in position. Advantageously, the slide plates 10 are easily installed to the beam 9. As shown in FIGS. 2 and 4, the beam 9 may have a parabolic shape that is configured to continuously support the slide plate 10 and resist deflection when the beam 9 is supported at the ends 15, 16 of the beam 9. The slide plate 10 may be removed from the beam 9 by sliding the slide plate 10 in the upstream direction back to the insertion position in which the pins 13 are again received in the openings 17. The slide plate 10 may then be moved upwardly in the normal direction N such that the pins 13 are removed downwardly through the openings 17. Accordingly, the slide plates 10 are easily interchangeable for improved maintenance of the whey draining machine. The whey draining belt 3 is removed from the support structure 1 when the slide plate 10 is mounted on or dismounted from the beam 9.

The slide plate 10 may include a plurality of drainage openings 22 that are spaced along the longitudinal direction L of the slide plate 10 for enabling drainage of whey while moving the curd. Each of the drainage openings 22 may be formed as an elongated slot that extends along the width of the slide plate 10. The drainage openings 22 may extend at an angle relative to the longitudinal direction L that is less than 90 degrees. The drainage openings 22 may be spaced by approximately 21.6 centimeters (8.5 inches).

Figure 5:
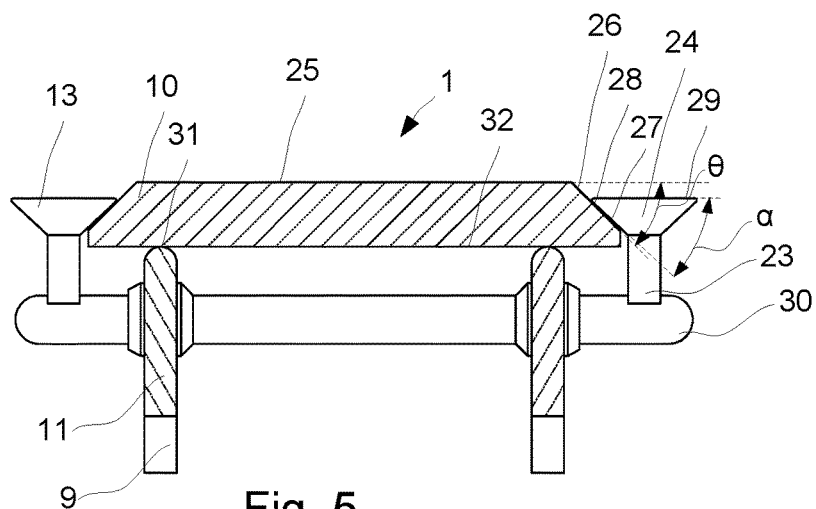
FIG. 5 is a front cross-sectional view of the support structure of FIG. 1.

FIG. 5 shows the engagement between the slide plate 10 and the pins 13, and between the slide plate 10 and the upper part 11 of the beam 9. Each pin 13 includes a pillar 23 and a head 24 arranged on the pillar 23. The head 24 may have any suitable shape, such as a conical shape or a spherical shape. Other shapes may be suitable. The head 24 may be shaped to have a larger cross-section as compared with the cross-section of the pillar 23. The pillar 23 may have a uniform cross-section whereas the head 24 may be formed to have a varying cross-section.

The slide plate 10 includes a chamfered top surface 25 that is arranged to abut the head 24 of the pin 13. A chamfer 26 of the chamfered top surface 25 is angled at an angle that is different from an angle $\alpha$ of a slide plate-engaging surface 27 of the head 24 to provide a point of contact 28 between the slide plate 10 and the head 24. The chamfer 26 may be formed as a full chamfer or bevel. The head 24 may extend over the chamfer 26. The angle $\theta$ corresponds to the angle of the chamfer 26 relative to the top surface 25 of the slide plate 10. The chamfer 26 is angled downwardly from the top surface 25. The angle $\alpha$ corresponds to the angle of the slide plate-engaging surface 27 relative to a top surface 29 of the head 24. The angles $\theta$ and $\alpha$ may be between 30 and 60 degrees.

When the slide plate 10 is arranged in the assembled position, the head 24 and the slide plate 10 are configured to provide a single point contact or a line contact that forms the point of contact 28 between the head 24 and the slide plate 10. As shown in FIG. 5, the angle $\theta$ may be greater than the angle $\alpha$ to provide a single point contact. The head 24 may be spherical in shape to provide a single point contact between the spherical shape and the flat shape of the chamfer 26 of the slide plate 10. The angles $\theta$ and $\alpha$ may be the same to provide a line contact with the chamfer 26 along which the slide plate-engaging surface 27 has continuous contact with the chamfer 26. The single point contact or line contact is advantageous for cleaning the support structure 1 with cleaning-in-place spray devices that are arranged in the whey draining machine proximate the point of contact 28.

The pin 13 further includes a support bar 30 that is attached between the upper part 11 of the beam 9 and the pillar 23 of the pin 13. The support bar 30 may protrude outwardly in a horizontal direction relative to the upper part 11 of the beam 9. The pillar 23 extends upwardly from the support bar 30 and the pillar 23 may be spaced from the upper part 11 of the beam 9. The pin 13 is secured to the upper part 11 and may be welded, clamped or bolted to the upper part 11. A top of the upper part 11 may form contact points 31 with a bottom surface 32 of the slide plate 10. For this purpose, the upper part 11 may have a round top surface. The contact points 31 provided between the upper part 11 and the slide plate 10 is advantageous for cleaning-in place of the underside of the slide plate 10.

Figure 6:
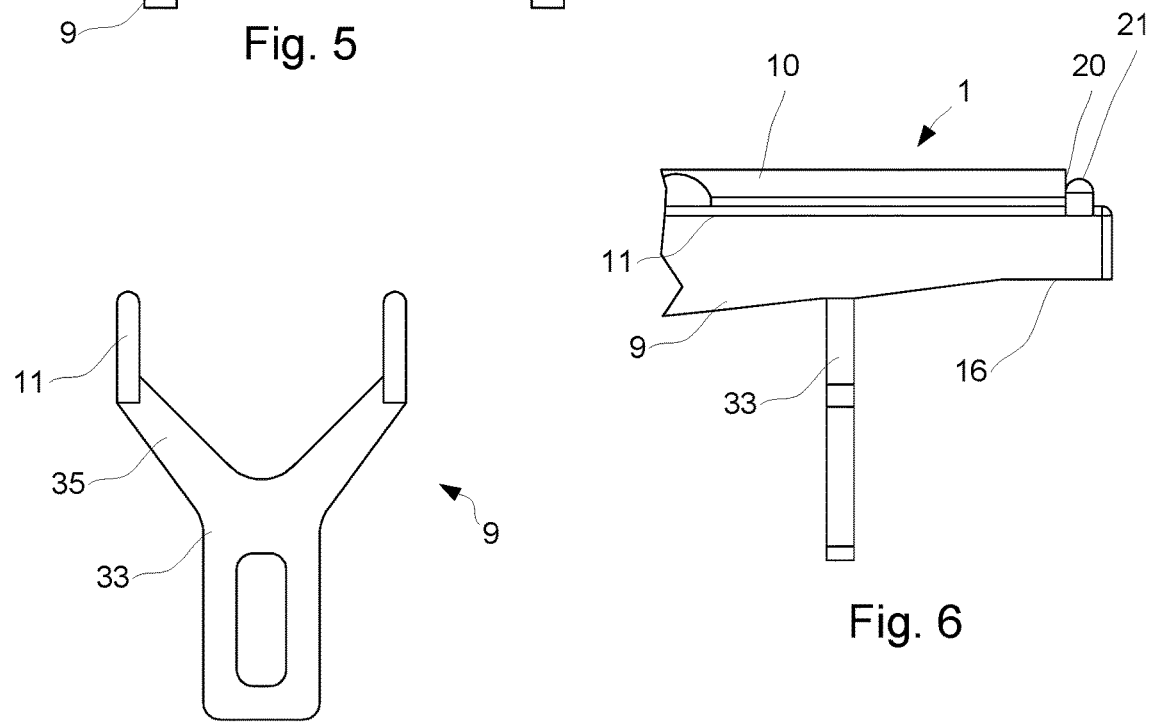
FIG. 6 is a detailed side view of an end of the support structure of FIG. 1.

FIG. 6 shows the end 16 of the beam 9 and the stopper 21. The stopper 21 may be formed as a protrusion that is secured to the upper part 11 of the beam 9 and extends upwardly from the beam 9. The stopper 21 may, just like the beam 9, be formed of a metal such as stainless steel. Alternatively, the stopper 21 may be formed of a rubber material or other polymeric material against which the end 20 of the slide plate 10 engages when the slide plate 10 is assembled and locked in position. A support post 33 may be arranged proximate the end 16 of the beam 9 to bear the load of the support structure 1 and maintain the support structure 1 at a predetermined height above the ground. Any number of support posts 33 may be provided and the support posts 33 may be arranged at opposite ends of the beam 9. The support posts 33 may be used to connect the support structures 1 to the carrier structures 12 (see FIG. 1).

Figure 7:
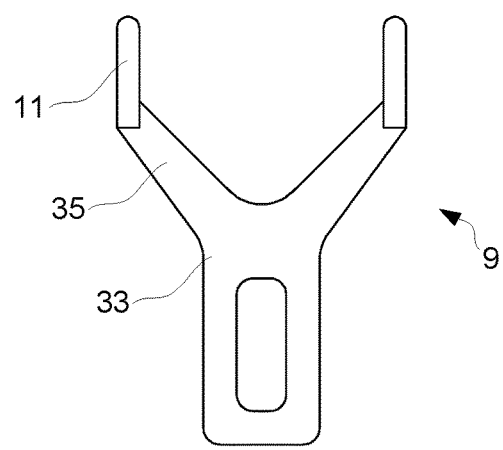
FIG. 7 is a front view of the beam of the support structure of FIG. 1.

FIG. 7 shows a front view of the beam 9 and the support post 33 which may have a y-shape. The support post 33 may be formed as two thin brackets that are arranged at the opposite ends 15, 16 of the beam 9 (shown in FIG. 2). Arms 35 of the y-shaped support post 33 support the beam 9 and extend directly upwardly from the support post 33. The beam 9 extends in the longitudinal direction L between the two thin brackets of the support post 33. The upper part 11 may define the parabolic shape of the beam 9 between the two thin brackets of the support post 33.

Figure 8:
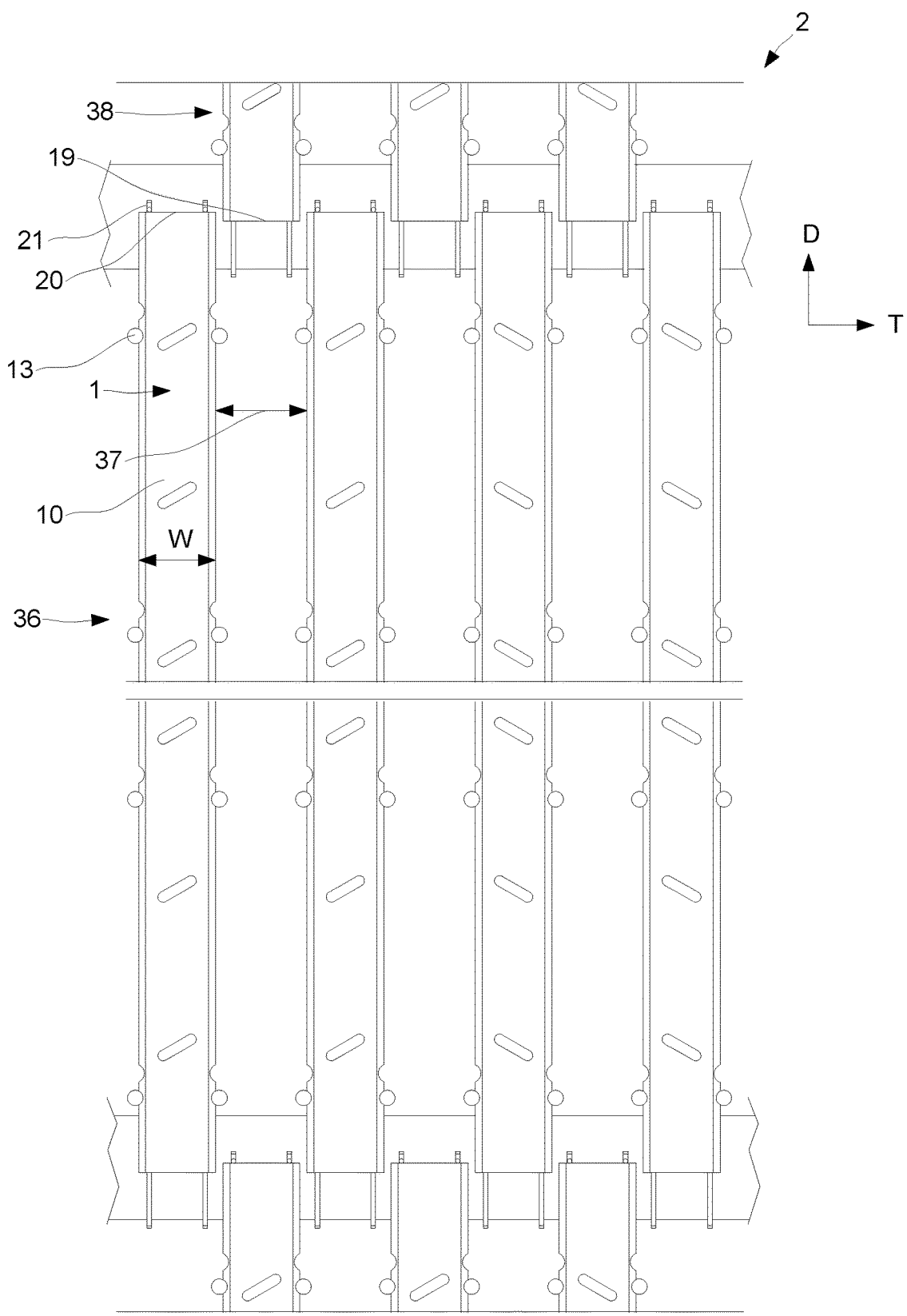
FIG. 8 is partial top view of the whey draining machine of FIG. 1 showing a plurality of support structures.

FIG. 8 shows the whey draining machine 2 in part including a plurality of the support structures 1. A first set 36 of support structures 1 includes support structures 1 that are arranged in parallel to each other in the transverse direction T relative to the direction of travel D of the whey draining belt with the transverse direction T being perpendicular to the direction of travel D. Each support structure 1 may be aligned in the direction of travel D. The transverse direction T also corresponds to the direction in which the width W of the support structures 1 extends. Each of the support structures 1 include the slide plate 10 that is engaged and locked in place by the pins 13 and the stoppers 21.

The support structures 1 in the first set 36 are separated or spaced in the transverse direction T by interspaces 37 between the support structures 1. Any suitable number of support structures 1 may be provided in the first set 36. Up to 16 support structures 1 may be provided in the transverse direction T. The interspaces 37 may have a distance in the transverse direction T that is approximately the same as the width W of the support structure 1. The distance of one of the interspaces 37 may be between 2% and 20% larger than the width W of the support structure 1.

The whey draining machine 2 includes a second set 38 of support structures 1 that may be the same as the support structures 1 of the first set 36. The second set 38 of support structures 1 includes support structures 1 that are downstream the first set 36 in the direction of travel D. The support structures 1 of the second set 38 are arranged in parallel to each other in the transverse direction T relative to the direction of travel D of the whey draining belt, with the transverse direction T being perpendicular relative to the direction of travel D.

The support structures 1 of the second set 38 are offset in the transverse direction T relative to the first set 36 of support structures 1. The second set 38 is offset by a distance that aligns, in the direction of travel D, support structures 1 of the first set 36 with interspaces 37 of the second set 38. Then support structures of the second set 38 are aligned with interspaces 37 of the first set 36, as seen in the direction of travel D. The first ends 19 of the support structures 1 in the second set 38 are arranged proximate the second ends 20 of the support structures 1 in the first set 36. More sets of support structures 1 may be provided in the direction of travel D. The offset arrangement of the first set 36 and the second set 38 is advantageous for both reducing the wear on the whey draining belt and cleaning the whey draining machine 1.

In another arrangement, the support structures 1 may be arranged in a chevron pattern in which the guide plates 10 are arranged in parallel to each other at an angle that is less than 90 degrees relative to the direction of travel D. A first and second set of support structures 1 may be angled toward a center of the whey draining machine 2 and toward each other to form the chevron pattern.

Figure 9:
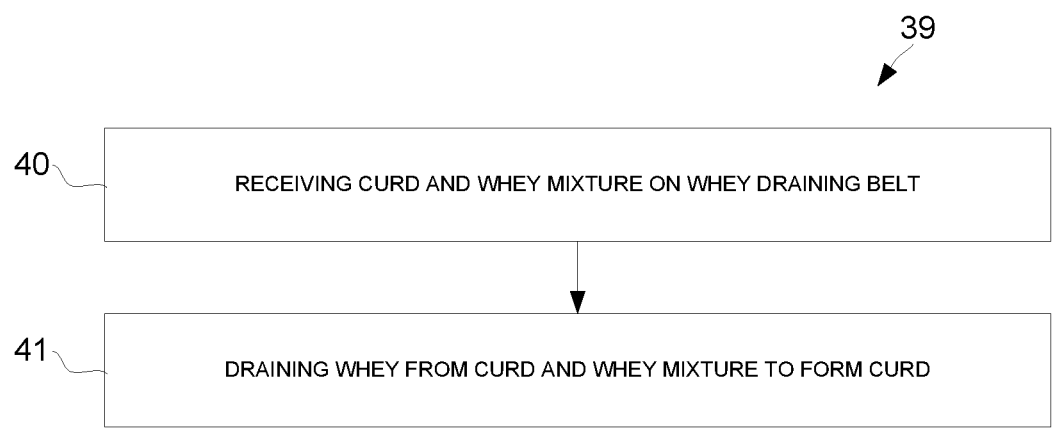
FIG. 9 is a flow chart of a method of draining whey from a curd and whey mixture using the whey draining machine of FIG. 1.

FIG. 9 shows a method 39 of draining whey from a curd and whey mixture. The whey draining machine 2 shown in FIG. 1 may be used to perform the method 39. Step 40 of the method 39 includes receiving a curd and whey mixture 5 on a whey draining belt 3 supported by a support structure 1 having a beam 9 formed of a metal material and a slide plate 10 formed of a plastic material and fixedly connectable to an upper part 11 of the beam 9 for allowing the whey draining belt 3 to slide over the slide plate 10. Step 41 of the method 39 includes draining the whey from the curd and whey mixture 5 as the whey draining belt 3 slides over the slide plate 10 to form curd 5. The drained curd 5 may then be milled, salted and mellowed to produce cheddar or a similar type of cheese.

The support structure for the whey draining machine is advantageous in reducing the friction in the support structure by eliminating the friction between the whey draining belt and the metal support structure and replacing the friction with friction between the whey draining belt and the plastic slide plate. The static coefficient of friction may be decreased by between 60% and 70%. The static coefficient of friction may be reduced from 0.35 in the conventional whey draining machine to 0.11 in the whey draining machine including the plastic slide plate. The dynamic coefficient of friction may be decreased by over 90%. The dynamic coefficient of friction may be reduced from 0.34 in the conventional whey draining machine to 0.01 in the whey draining machine including the plastic slide plate. The reduction in friction consequently reduces the stick-slip phenomenon.

In addition to reducing friction in the whey draining machine, using the plastic slide plates in the whey draining machine provides improved cleaning-in-place of the underside of the whey draining belt. Still another advantage of using the plastic slide plates is that wear on the belt is reduced to increase the life of the belt. The whey draining machine may also have an increased capacity for curd due to lower belt tension provided by using the plastic slide plates.

From the description above follows that, although various embodiments of the invention have been described and shown, the invention is not restricted thereto, but may also be embodied in other ways within the scope of the subject-matter defined in the following claims.

The invention claimed is:

1. A support structure for a whey draining belt, the support structure comprising:
a beam formed of a metal material; and
a slide plate formed of a plastic material and fixedly connectable to an upper part of the beam for allowing the whey draining belt to slide over the slide plate.

2. The support structure according to claim 1, wherein the beam comprises at least one pin that extends upwardly from the beam to engage against the slide plate.

3. The support structure according to claim 2, wherein the slide plate comprises at least one opening for receiving the at least one pin.

4. The support structure according to claim 3, wherein the slide plate comprises a plurality of openings that are spaced along opposing sides of the slide plate and the beam comprises a plurality of pins corresponding to the plurality of openings.

5. The support structure according to claim 4, wherein the slide plate is slidable in a longitudinal direction of the slide plate, from an insertion position in which the plurality of pins are received in the plurality of openings to an assembled position in which the plurality of pins are offset from the plurality of openings to engage the opposing sides of the slide plate.

6. The support structure according to claim 2, wherein the at least one pin comprises a pillar and a head that is arranged on the pillar.

7. The support structure according to claim 6, wherein the head and the slide plate are configured to engage with a point contact or a line contact.

8. The support structure according to claim 6, wherein the slide plate comprises a chamfered top surface that is arranged to abut the head of the at least one pin.

9. The support structure according to claim 8, wherein a chamfer of the chamfered top surface is angled at an angle that is different from an angle of a slide plate-engaging surface of the head to provide the contact between the slide plate and the head.

10. The support structure (according to claim 1, comprising a stopper that is arranged on the beam and engageable with an end of the slide plate for positioning the slide plate in a longitudinal direction of the slide plate.

11. The support structure according to claim 1, wherein the slide plate comprises a plurality of drainage openings.

12. A whey draining machine comprising a plurality of whey draining belts supported by a plurality of support structures according to claim 1,
wherein the plurality of support structures form a set of support structures in which the support structures are arranged in parallel to each other in a transverse direction relative to a direction of travel of the plurality of whey draining belts, and separated in the transverse direction by interspaces between the support structures.

13. The whey draining machine according to claim 12, wherein the set of support structures is a first set of support structures, the whey draining machine comprising a second, similar set of support structures relative to the first set of support structures, the second set of support structures being arranged downstream the first set of support structures and offset in the transverse direction relative to the first set of support structures by a distance that aligns, in the direction of travel, the support structures of the first set with the interspaces of the second set.

14. The whey draining machine according to claim 12, comprising an inlet for receiving a curd and whey mixture and an outlet for discharging the curd after the curd is drained of whey, wherein the whey draining belt is arranged to move the curd from the inlet towards the outlet.

15. A method of draining whey from a curd and whey mixture, comprising:

receiving a curd and whey mixture on a whey draining belt supported by a support structure having a beam formed of a metal material, and a slide plate formed of a plastic material and fixedly connectable to an upper part of the beam for allowing the whey draining belt to slide over the slide plate; and draining the whey from the curd and whey mixture as the whey draining belt slides over the slide plate to form curd.

* * * * *